United States Patent
Samii (10) Patent No.: US 10,103,938 B1
(45) Date of Patent: Oct. 16, 2018

(54) VEHICLE NETWORK SWITCH CONFIGURATIONS BASED ON DRIVING MODE

(71) Applicant: GM GLOBAL TECHNOLOGY OPERATIONS LLC, Detroit, MI (US)

(72) Inventor: Soheil Samii, Royal Oak, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 17 days.

(21) Appl. No.: 15/603,973

(22) Filed: May 24, 2017

(51) Int. Cl.
*H04L 12/24* (2006.01)
*H04L 29/08* (2006.01)
*H04L 12/931* (2013.01)
*B60R 16/023* (2006.01)
*G05D 1/00* (2006.01)

(52) U.S. Cl.
CPC ........ *H04L 41/0813* (2013.01); *B60R 16/023* (2013.01); *H04L 49/351* (2013.01); *H04L 67/125* (2013.01); *G05D 1/0088* (2013.01)

(58) Field of Classification Search
CPC . H04L 41/0813; H04L 49/351; H04L 67/125; B60R 16/023; G05D 1/0088
See application file for complete search history.

(56) References Cited

U.S. PATENT DOCUMENTS

| 9,720,415 | B2 * | 8/2017 | Levinson | G01S 17/42 |
| 2015/0066284 | A1 * | 3/2015 | Yopp | B60W 30/00 701/29.2 |
| 2016/0167653 | A1 * | 6/2016 | Malone | B60W 10/18 701/23 |
| 2017/0050638 | A1 * | 2/2017 | Gordon | B60W 30/16 |
| 2017/0126810 | A1 * | 5/2017 | Kentley | H04L 67/125 |
| 2018/0118219 | A1 * | 5/2018 | Hiei | B60W 40/09 |
| 2018/0201138 | A1 * | 7/2018 | Yellambalase | B60L 3/0046 |

* cited by examiner

*Primary Examiner* — Duc C Ho
(74) *Attorney, Agent, or Firm* — Lorenz & Kopf, LLP (57) ABSTRACT

Systems and methods are provided for operating local area network (LAN) switches in a vehicle. A system includes a plurality of sensors, a mode determination module, and a LAN switch. The sensors are configured to generate a plurality of data streams. The mode determination module is configured for determining a current driving mode of the vehicle. The LAN switch is configured for selectively transmitting and selectively inhibiting each of the plurality of data streams based on the current driving mode of the vehicle.

20 Claims, 5 Drawing Sheets

VEHICLE NETWORK SWITCH CONFIGURATIONS BASED ON DRIVING MODE

TECHNICAL FIELD

The present disclosure generally relates to network switches in vehicles, and more particularly relates to systems and methods for configuring switches in an automated vehicle based on the driving mode of the automated vehicle.

INTRODUCTION

An autonomous vehicle is a vehicle that is capable of sensing its environment and navigating with little or no user input. An autonomous vehicle senses its environment using sensing devices such as radar, lidar, image sensors, and the like. The autonomous vehicle may further use information from global positioning systems (GPS) technology, navigation systems, vehicle-to-vehicle communication, vehicle-to-infrastructure technology, and/or drive-by-wire systems to navigate the vehicle.

Vehicle automation according to one definition has been categorized into numerical levels ranging from Zero, corresponding to no automation with full human control, to Five, corresponding to full automation with no human control. Various automated driver-assistance systems, such as cruise control, adaptive cruise control, and parking assistance systems correspond to lower automation levels, while true "driverless" vehicles correspond to higher automation levels.

This vehicle automation requires many sensing devices to accurately detect the environment and operate the vehicle. These sensing devices often transmit large amounts of data across the vehicle network. In order to accommodate the large amounts of data, networking equipment that accommodates the large amounts of data must be installed in the vehicle. As the capacity of the network equipment increases, however, the cost of the networking equipment also increases.

Accordingly, it is desirable to provide systems and methods that reduce the network equipment capacity needs in a vehicle network. Furthermore, other desirable features and characteristics of the present invention will become apparent from the subsequent detailed description and the appended claims, taken in conjunction with the accompanying drawings and the foregoing technical field and background.

SUMMARY

Systems and methods are provided for operating a local area network (LAN) switch in a vehicle. In one embodiment, a system includes a plurality of sensors, a mode determination module, and a LAN switch. The sensors are configured to generate a plurality of data streams. The mode determination module is configured for determining a current driving mode of the vehicle. The LAN switch is configured for selectively transmitting and selectively inhibiting each of the plurality of data streams based on the current driving mode of the vehicle.

In one embodiment, a system for an autonomous vehicle includes a first sensor, a second sensor, an automation module, a LAN switch, and a switch configuration module. The first sensor is configured to generate a first data stream and the second sensor is configured to generate a second data stream. The automation module is configured for driving the autonomous vehicle in a first driving mode using the first data stream and for driving the autonomous vehicle in a second driving mode using the second data stream. The LAN switch includes a first sensor port, a second sensor port, and an egress port. The first sensor port is coupled for electronic communication with the first sensor to receive the first data stream. The second sensor port is coupled for electronic communication with the second sensor to receive the second data stream. The egress port is coupled for electronic communication with the automation module. The switch configuration module is configured for: inhibiting transmission of the first data stream from the first sensor port to the egress port in response to operation of the autonomous vehicle in the second driving mode; permitting transmission of the first data stream from the first sensor port to the egress port in response to operation of the autonomous vehicle in the first driving mode; inhibiting transmission of the second data stream from the second sensor port to the egress port in response to operation of the autonomous vehicle in the first driving mode; and permitting transmission of the second data stream from the second sensor port to the egress port in response to operation of the autonomous vehicle in the second driving mode.

In one embodiment, a method of operating an autonomous vehicle having a first sensor, a second sensor, and a LAN switch includes: inhibiting transmission of a first data stream of the first sensor from a first sensor port to an egress port of the LAN switch in response to operation of the autonomous vehicle in a second driving mode; permitting transmission of the first data stream from the first sensor port to the egress port in response to operation of the autonomous vehicle in a first driving mode; inhibiting transmission of a second data stream of the second sensor from a second sensor port to the egress port of the LAN switch in response to operation of the autonomous vehicle in the first driving mode; and permitting transmission of the second data stream from the second sensor port to the egress port in response to operation of the autonomous vehicle in the second driving mode.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Various embodiments disclosed herein describe controlled reconfiguration of network/LAN switch configurations (e.g., forwarding tables and ingress filters in an IEEE 802.1 compliant Ethernet switch) at runtime based on functional or failure modes in a vehicle. These embodiments limit communication bandwidth requirements and permit reduced cost and complexity of physical interfaces (e.g., may use a 100 Mbit/s link instead of 1000 Mbit/s link without controlled reconfiguration). Additionally, reduced communication bandwidth leads to reduced energy consumption and reduced processing requirements.

Figure 1:
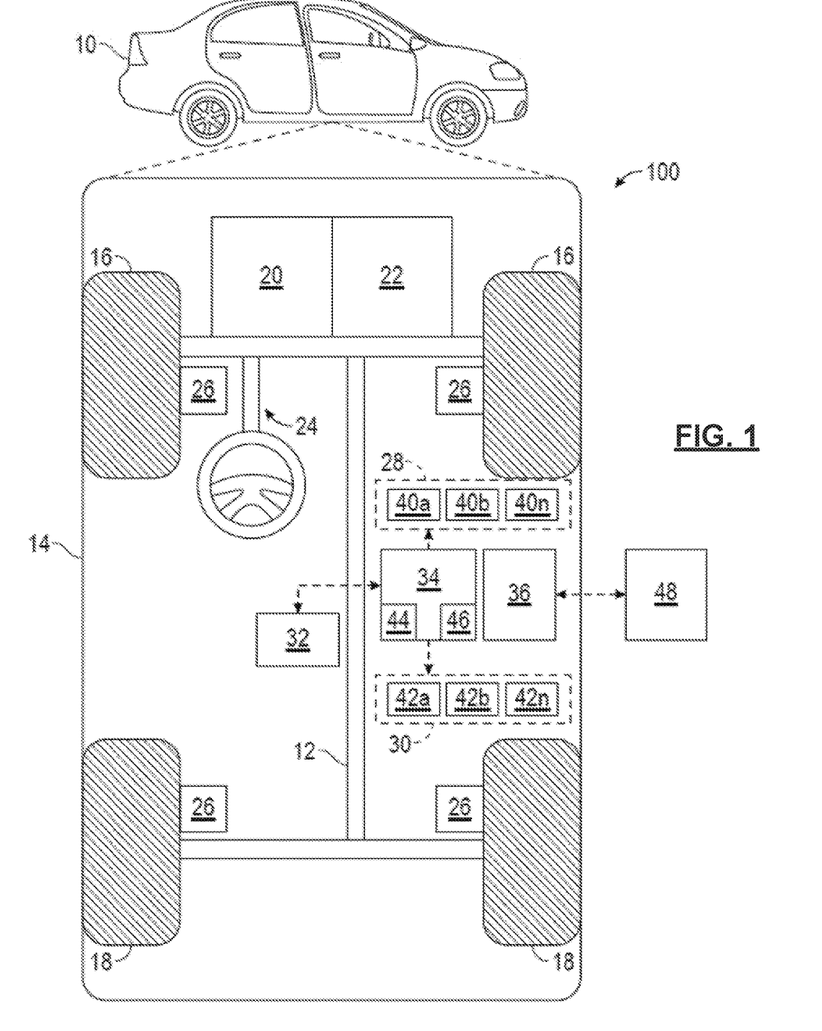
FIG. 1 is a functional block diagram illustrating an autonomous vehicle having a control system, in accordance with various embodiments.

With reference to FIG. 1, a control system shown generally at 100 is associated with a vehicle 10 in accordance with various embodiments. In general, control system 100 reconfigures a static configuration of a local area network (LAN) switch in response to driving mode changes in vehicle 10 to reduce the bandwidth requirements of ports on the LAN switch.

As depicted in FIG. 1, the vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16-18 are each rotationally coupled to the chassis 12 near a respective corner of the body 14. Although an automobile is illustrated, it should be appreciated that the systems and methods described herein may be applied to any embedded or cyber-physical system without departing from the scope of the present disclosure.

In various embodiments, the vehicle 10 is an autonomous vehicle and the control system 100 is incorporated into the vehicle 10. The vehicle 10 is, for example, a vehicle that is automatically controlled to carry passengers from one location to another. The vehicle 10 is depicted in the illustrated embodiment as a passenger car, but it should be appreciated that any other vehicle including motorcycles, trucks, sport utility vehicles (SUVs), recreational vehicles (RVs), marine vessels, aircraft, etc., can also be used. In an exemplary embodiment, the vehicle 10 is a so-called Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver.

As shown, the vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16-18 according to selectable speed ratios. According to various embodiments, the transmission system 22 may include a step-ratio automatic transmission, a continuously-variable transmission, or other appropriate transmission. The brake system 26 is configured to provide braking torque to the vehicle wheels 16-18. The brake system 26 may, in various embodiments, include friction brakes, brake by wire, a regenerative braking system such as an electric machine, and/or other appropriate braking systems. The steering system 24 influences a position of the of the vehicle wheels 16-18. While depicted as including a steering wheel for illustrative purposes, in some embodiments contemplated within the scope of the present disclosure, the steering system 24 may not include a steering wheel.

The sensor system 28 includes one or more sensing devices 40a-40n that sense observable conditions of the exterior environment and/or the interior environment of the vehicle 10. The sensing devices 40a-40n can include, but are not limited to, RADARs, LIDARs, global positioning systems, optical cameras, thermal cameras, ultrasonic sensors, and/or other sensors. The actuator system 30 includes one or more actuator devices 42a-42n that control one or more vehicle features such as, but not limited to, the propulsion system 20, the transmission system 22, the steering system 24, and the brake system 26. In various embodiments, the vehicle features can further include interior and/or exterior vehicle features such as, but are not limited to, doors, a trunk, and cabin features such as air, music, lighting, etc. (not numbered).

The data storage device 32 stores data for use in automatically controlling the vehicle 10. In various embodiments, the data storage device 32 stores defined maps of the navigable environment. In various embodiments, the defined maps may be predefined by and obtained from a remote system (described in further detail with regard to FIG. 2). For example, the defined maps may be assembled by the remote system and communicated to the vehicle 10 (wirelessly and/or in a wired manner) and stored in the data storage device 32. As can be appreciated, the data storage device 32 may be part of the controller 34, separate from the controller 34, or part of the controller 34 and part of a separate system.

The controller 34 includes at least one processor 44 and a computer readable storage device or media 46. The processor 44 can be any custom made or commercially available processor, a central processing unit (CPU), a graphics processing unit (GPU), an auxiliary processor among several processors associated with the controller 34, a semiconductor based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the vehicle 10.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the vehicle 10, and generate control signals to the actuator system 30 to automatically control the components of the vehicle 10 based on the logic, calculations, methods, and/or algorithms. Although only one controller 34 is shown in FIG. 1, embodiments of the vehicle 10 may include any number of controllers 34 that communicate over any suitable communication medium or a combination of communication mediums and that cooperate to process the sensor signals, perform logic, calculations, methods, and/or algorithms, and generate control signals to automatically control features of the vehicle 10.

In various embodiments, one or more instructions of the controller 34 are embodied in the control system 100 and, when executed by the processor 44, reconfigure a LAN switch of the vehicle 10 based on the driving mode of the vehicle 10. For example, the controller 34 may load static forwarding rules and ingress filters on the LAN switch to selectively inhibit transmission of data streams from sensor system 28.

Figure 2:
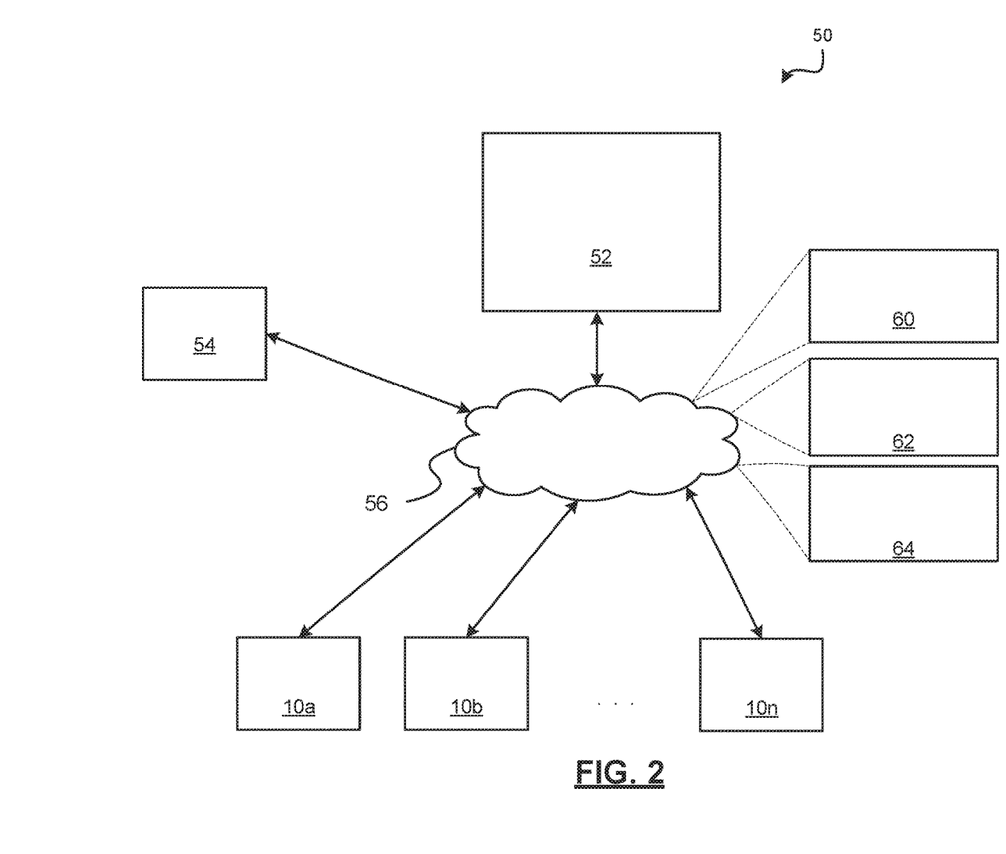
FIG. 2 is a functional block diagram illustrating a transportation system having one or more autonomous vehicles of FIG. 1, in accordance with various embodiments.

The communication system 36 is configured to wirelessly communicate information to and from other entities 48, such as but not limited to, other vehicles ("V2V" communication) infrastructure ("V2I" communication), remote systems, and/or personal devices (described in more detail with regard to FIG. 2). In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

With reference now to FIG. 2, in various embodiments, the autonomous vehicle 10 described with regard to FIG. 1 may be suitable for use in the context of a taxi or shuttle system in a certain geographical area (e.g., a city, a school or business campus, a shopping center, an amusement park, an event center, or the like) or may simply be managed by a remote system. For example, the autonomous vehicle 10 may be associated with an autonomous vehicle based remote transportation system. FIG. 2 illustrates an exemplary embodiment of an operating environment shown generally at 50 that includes an autonomous vehicle based remote transportation system 52 that is associated with one or more autonomous vehicles 10a-10n as described with regard to FIG. 1. In various embodiments, the operating environment 50 further includes one or more user devices 54 that communicate with the autonomous vehicle 10 and/or the remote transportation system 52 via a communication network 56.

The communication network 56 supports communication as needed between devices, systems, and components supported by the operating environment 50 (e.g., via tangible communication links and/or wireless communication links). For example, the communication network 56 can include a wireless carrier system 60 such as a cellular telephone system that includes a plurality of cell towers (not shown), one or more mobile switching centers (MSCs) (not shown), as well as any other networking components required to connect the wireless carrier system 60 with a land communications system. Each cell tower includes sending and receiving antennas and a base station, with the base stations from different cell towers being connected to the MSC either directly or via intermediary equipment such as a base station controller. The wireless carrier system 60 can implement any suitable communications technology, including for example, digital technologies such as CDMA (e.g., CDMA2000), LTE (e.g., 4G LTE or 5G LTE), GSM/GPRS, or other current or emerging wireless technologies. Other cell tower/base station/MSC arrangements are possible and could be used with the wireless carrier system 60. For example, the base station and cell tower could be co-located at the same site or they could be remotely located from one another, each base station could be responsible for a single cell tower or a single base station could service various cell towers, or various base stations could be coupled to a single MSC, to name but a few of the possible arrangements.

Apart from including the wireless carrier system 60, a second wireless carrier system in the form of a satellite communication system 64 can be included to provide uni-directional or bi-directional communication with the autonomous vehicles 10a-10n. This can be done using one or more communication satellites (not shown) and an uplink transmitting station (not shown). Uni-directional communication can include, for example, satellite radio services, wherein programming content (news, music, etc.) is received by the transmitting station, packaged for upload, and then sent to the satellite, which broadcasts the programming to subscribers. Bi-directional communication can include, for example, satellite telephony services using the satellite to relay telephone communications between the vehicle 10 and the station. The satellite telephony can be utilized either in addition to or in lieu of the wireless carrier system 60.

A land communication system 62 may further be included that is a conventional land-based telecommunications network connected to one or more landline telephones and connects the wireless carrier system 60 to the remote transportation system 52. For example, the land communication system 62 may include a public switched telephone network (PSTN) such as that used to provide hardwired telephony, packet-switched data communications, and the Internet infrastructure. One or more segments of the land communication system 62 can be implemented using a standard wired network, a fiber or other optical network, a cable network, power lines, other wireless networks such as wireless local area networks (WLANs), or networks providing broadband wireless access (BWA), or any combination thereof. Furthermore, the remote transportation system 52 need not be connected via the land communication system 62, but can include wireless telephony equipment so that it can communicate directly with a wireless network, such as the wireless carrier system 60.

Although only one user device 54 is shown in FIG. 2, embodiments of the operating environment 50 can support any number of user devices 54, including multiple user devices 54 owned, operated, or otherwise used by one person. Each user device 54 supported by the operating environment 50 may be implemented using any suitable hardware platform. In this regard, the user device 54 can be realized in any common form factor including, but not limited to: a desktop computer; a mobile computer (e.g., a tablet computer, a laptop computer, or a netbook computer); a smartphone; a video game device; a digital media player; a piece of home entertainment equipment; a digital camera or video camera; a wearable computing device (e.g., smart watch, smart glasses, smart clothing); or the like. Each user device 54 supported by the operating environment 50 is realized as a computer-implemented or computer-based device having the hardware, software, firmware, and/or processing logic needed to carry out the various techniques and methodologies described herein. For example, the user device 54 includes a microprocessor in the form of a programmable device that includes one or more instructions stored in an internal memory structure and applied to receive binary input to create binary output. In some embodiments, the user device 54 includes a GPS module capable of receiving GPS satellite signals and generating GPS coordinates based on those signals. In other embodiments, the user device 54 includes cellular communications functionality such that the device carries out voice and/or data communications over the communication network 56 using one or more cellular communications protocols, as are discussed herein. In various embodiments, the user device 54 includes a visual display, such as a touch-screen graphical display, or other display.

The remote transportation system 52 includes one or more backend server systems, which may be cloud-based, network-based, or resident at the particular campus or geographical location serviced by the remote transportation system 52. The remote transportation system 52 can be manned by a live advisor, or an automated advisor, or a combination of both. The remote transportation system 52 can communicate with the user devices 54 and the autonomous vehicles 10*a*-10*n* to schedule rides, dispatch autonomous vehicles 10*a*-10*n*, and the like. In various embodiments, the remote transportation system 52 stores store account information such as subscriber authentication information, vehicle identifiers, profile records, behavioral patterns, and other pertinent subscriber information.

In accordance with a typical use case workflow, a registered user of the remote transportation system 52 can create a ride request via the user device 54. The ride request will typically indicate the passenger's desired pickup location (or current GPS location), the desired destination location (which may identify a predefined vehicle stop and/or a user-specified passenger destination), and a pickup time. The remote transportation system 52 receives the ride request, processes the request, and dispatches a selected one of the autonomous vehicles 10*a*-10*n* (when and if one is available) to pick up the passenger at the designated pickup location and at the appropriate time. The transportation system 52 can also generate and send a suitably configured confirmation message or notification to the user device 54, to let the passenger know that a vehicle is on the way.

As can be appreciated, the subject matter disclosed herein provides certain enhanced features and functionality to what may be considered as a standard or baseline autonomous vehicle 10 and/or an autonomous vehicle based remote transportation system 52. To this end, an autonomous vehicle and autonomous vehicle based remote transportation system can be modified, enhanced, or otherwise supplemented to provide the additional features described in more detail below.

Figure 3:
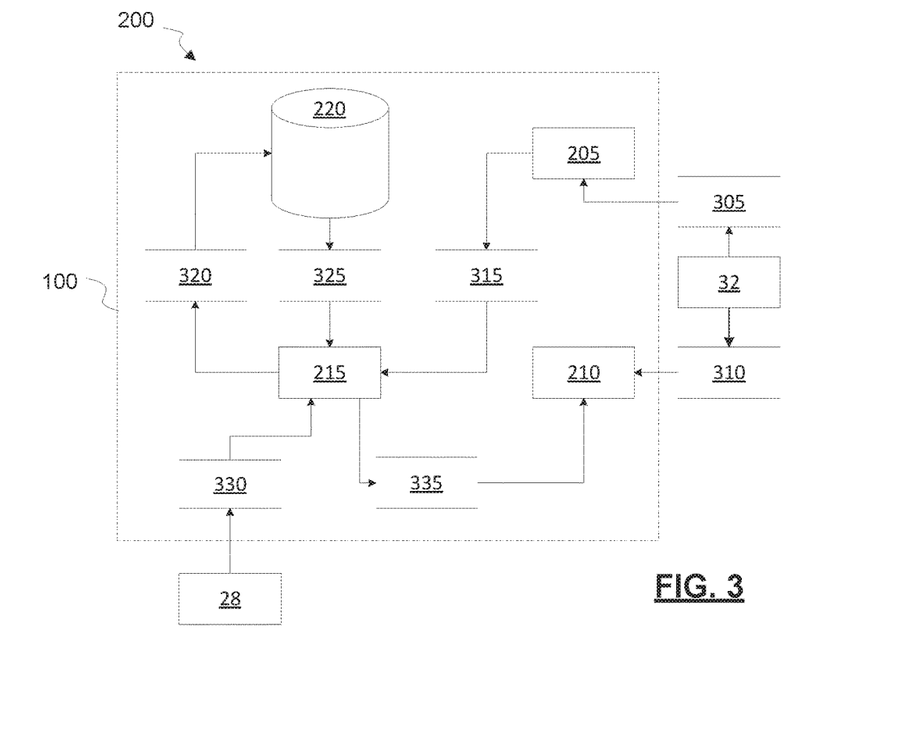
FIG. 3 is a dataflow diagram illustrating a control system of the autonomous vehicle of FIG. 1, in accordance with various embodiments.

Referring now to FIG. 3, and with continued reference to FIG. 1, a dataflow diagram 200 illustrates various embodiments of the control system 100, which may be embedded within the controller 34. Various embodiments of the control system 100 according to the present disclosure may include any number of sub-modules embedded within the controller 34. As can be appreciated, the sub-modules shown in FIG. 3 may be combined and/or further partitioned to similarly control the vehicle 10. Inputs to the control system 100 may be received from the sensor system 28, received from other control modules (not shown) associated with the vehicle 10, received from the communication network 56 at the communication system 36, and/or determined/modeled by other sub-modules (not shown) within the controller 34. In various embodiments, the control system 100 includes a mode determination module 205, an automation module 210, a switch configuration module 215, and a switch configuration database 220.

Generally, control system 100 is configured to load static configurations of forwarding rules and ingress filters for a LAN switch of vehicle 10. Accordingly, the total bandwidth requirements of various ports on the LAN switch may be kept below a threshold, above which commercially available LAN switches transition to more expensive hardware that accommodates higher bandwidth.

Mode determination module 205 retrieves a current mode indication 305 from data storage device 32 and generates a change configuration command 315 for switch configuration module 215. Current mode indication 305 indicates the current automation mode in which vehicle 10 is operating. For example, vehicle 10 may be in an automated parking mode using surround view cameras, a low speed lane following mode using surround view cameras, a high-speed driving mode for freeway driving (e.g., lane following, lane departure warning, object detection, freeway lane change) using front and rear long range cameras, a low speed driving mode for residential street driving, a night driving mode, or other automation modes of vehicle 10. In some embodiments, the driving mode may be configured to reach a minimal risk condition of the vehicle. In some embodiments, the driving mode requires night vision capability. The various driving modes each require input from a specific combination of sensors 40*a-n*, as will be described below.

In some embodiments, current mode indication 305 is transmitted to mode determination module 205 every time a mode change has occurred. In some embodiments, mode determination module 215 checks for mode changes based on hardware or software failures in components of vehicle 10. For example, if there is a component or link failure, it is detected by a hardware or software component in the system, subsequently leading to a mode change. As will be appreciated by those with ordinary skill in the art, vehicle 10 is aware of the mode in which vehicle 10 is operating, and therefore the details of determining the mode beyond retrieving the current mode indication are beyond the scope of this disclosure.

Automation module 210 similarly receives automation instructions 310 from data storage device 32. Automation instructions 310 may be originally generated using any suitable automated driving algorithm, the details of which—outside of retrieving the instructions after calculation—are beyond the scope of this disclosure. Automation instructions 310 may instruct any level of automation in vehicle 10. For example, automation instructions 310 may command level one automation associated with low levels of vehicle automation, may command level five automation for full "driverless" control of vehicle 10, or may command operation according to automation levels two, three, or four, as described above.

Switch configuration module 215 is configured to receive change configuration command 315 and to generate configuration update request 320 for switch configuration database 220. Change configuration command 315 indicates to switch configuration module 215 that a new static configuration of the LAN switch should be loaded. Accordingly, in response to receiving change configuration command 315, switch configuration module 215 requests a configuration 325 from switch configuration database 220. Configuration 325 indicates which forwarding rules and ingress filters to apply to the LAN switch for the indicated current driving mode, as will be appreciated by those of ordinary skill in the art.

Switch configuration database 220 stores configurations for each automated driving mode of vehicle 10, and transmits to switch configuration module 215 the configuration 325 based on the automated driving mode indicated in change configuration command 315. In the example provided, the configurations are predetermined based on what sensors 40*a-n* are used in each automated driving mode. In some examples, the configurations are predetermined based on limiting a bandwidth transmitted through a port of the LAN switch to below 100 megabits per second.

In the example provided, switch configuration database 220 is hosted within a centralized master controller that distributes the updated configurations to local hosts at each LAN switch during a mode change. In some embodiments, switch configuration database 220 may be stored in each LAN switch. In some embodiments, switch configuration database 220 may be stored in host controllers associated with each LAN switch.

Switch configuration module 215 is further configured to receive sensor data 330 from sensor system 28 and to transmit filtered sensor data 335 for automation module 210 based on configuration 325. For example, when a long-range radar sensor of sensor system 28 is not used in the current automated driving mode of vehicle 10, switch configuration module 215 will instruct the LAN switch of vehicle 10 to inhibit or block data streams from the long-range radar sensor. Accordingly, an egress port coupled with automation module 210 has lower bandwidth requirements than would be required if the LAN switch forwarded long range RADAR data to automation module 210.

In the example provided, a centralized master controller initiates reconfiguration and communicates to local hosts at each LAN switch to reconfigure the local switch. In some embodiments, the local hosts initiate the reconfiguration. In some embodiments, some portions of switch configuration module 215 may be implemented in the sensors, which implement an on/off state that is triggered by network communication to each individual sensor depending on the mode change.

Automation module 210 is configured to receive filtered sensor data 335 and operate vehicle 10 based on filtered sensor data 335, which is based on the current driving mode of vehicle 10. It should be appreciated that automation module 210 may operate vehicle 10 based on any of automations levels one through five, as described above.

Figure 4:
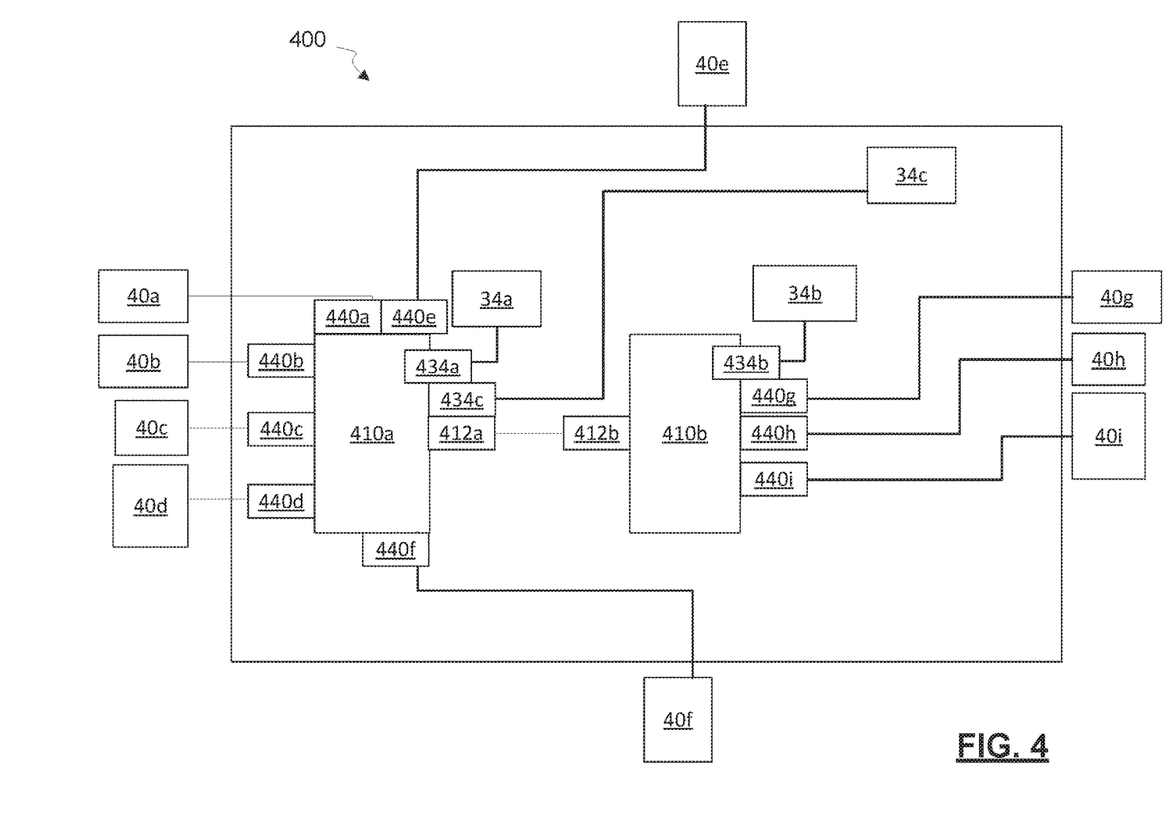
FIG. 4 is a functional block diagram illustrating an electrical architecture of the autonomous vehicle of FIG. 1, in accordance with various embodiments.

Referring now to FIG. 4, and with continued reference to FIGS. 1-3, a functional block diagram illustrates an electrical architecture 400 in accordance with the present disclosure. It should be appreciated that many different topologies for electrical architecture 400 may be used without departing from the scope of the present disclosure.

Electrical architecture 400 includes sensors 40*a-i*, sub-controllers 34*a-c*, and LAN switches 410*a-b*. In the example provided, sensors 40*a* and 40*g* are front and rear long range RADAR sensors, sensors 40*b* are front and rear short range RADAR sensors, sensors 40*c* and 40*h* are front and rear visual spectrum camera, and sensors 40*d-f* and 40*i* are downward facing surround view visual spectrum cameras.

Sub-controllers 34*a-c* may be any combination of components described above for controller 34 and may include any combination of modules configured to operate vehicle 10 or to execute the tasks described below. In the example provided, sub-controllers 34*a-b* are camera controllers and sub-controller 34*c* is a RADAR controller. Sub controllers 34*a-b* are configured to receive data streams from camera sensors 40*c-f* and 40*h-i* and process the data streams for use by vehicle 10 during navigation, as will be appreciated by those of ordinary skill in the art. Sub-controller 34*c* is configured to receive data streams from RADAR sensors 40*a-b* and 40*g* and to process the data streams for use by vehicle 10 during navigation, as will be appreciated by those of ordinary skill in the art.

LAN switches 410*a-b* include ports 412*a-b*, ports 434*a-c*, and sensor ports 440*a-i*. Ports 440*a-i* are coupled for electronic communication with the respectively lettered sensors 40*a-i*, ports 434*a-c* are coupled for electronic communication with the respectively lettered sub-controllers 34*a-c*, and ports 412*a-b* are coupled for electronic communication with each other. For example, the ports may be electronically coupled by physically connected networking cables, such as Category 5 ethernet cables terminated with eight pin and eight conductor type connectors. The ports are considered ingress ports when receiving data streams and are considered egress ports when transmitting data streams. It should be appreciated that any physical port in LAN switches 410*a-b* may include physical connections for each of transmission and receipt of data from components connected to the ports. Accordingly, as used herein, the term "ingress port" refers to any port that is receiving the data stream recited, and the term "egress port" refers to any port that would typically transmit the data stream to another component. In the example provided, each of Ethernet switches 410*a-b* incorporates a switch configuration module 215. In the example provided, the LAN switches are Ethernet switches.

Figure 5:
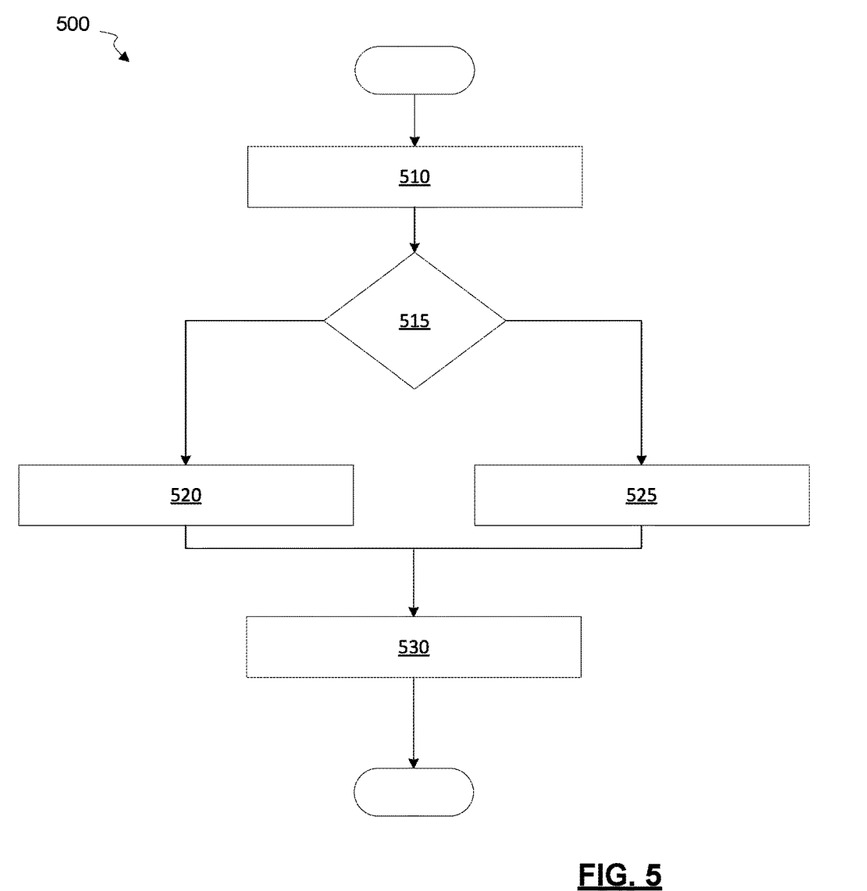
FIG. 5 is a flowchart illustrating a control method for operating a local area network switch of the autonomous vehicle of FIG. 1, in accordance with various embodiments.

Referring now to FIG. 5, and with continued reference to FIGS. 1-4, a flowchart illustrates a control method 500 for operating a local area network (LAN) switch of the autonomous vehicle that can be performed by the control system 100 of FIG. 1 in accordance with the present disclosure. As can be appreciated in light of the disclosure, the order of operation within the method is not limited to the sequential execution as illustrated in FIG. 5, but may be performed in one or more varying orders as applicable and in accordance with the present disclosure. In various embodiments, the method 500 may be scheduled to run based on one or more predetermined events, and/or may run continuously during operation of the vehicle 10.

In general, method 500 is an algorithm that selectively inhibits or transmits data flows between ports on a LAN switch based on the automated driving mode of a vehicle. In other words, the switches may be reconfigured to block flows that are unnecessary for the current driving mode and to forward flows necessary for the current driving mode when there is a mode change. The selective inhibition or transmission permits the transmission capacity of the LAN switch to be decreased for cost savings in vehicle 10.

Control system 100 receives a plurality of data streams generated by a plurality of sensors in task 510. For example, sensors 40*a-f* may generate sensor data 330 that are received by switch configuration module 215 of LAN switch 410*a*.

Control system 100 determines whether the data streams are used in a current driving mode of the vehicle in task 515. For example, mode determination module 205 may determine the current driving mode of vehicle 10 and generate change configuration command 315 for switch configuration module 215. Switch configuration module may then generate configuration update request 320 and receive configuration 325 that indicates which data streams are used in the current automated driving mode of the vehicle.

When the data streams are used in the current driving mode of the vehicle, method 500 proceeds from task 515 to task 520. Control system 100 selectively transmits the data streams through a LAN switch in task 520. For example, switch configuration module 215 may load configuration 325 into LAN switches 410*a-b*. As described above, configuration 325 has a static forwarding rule configuration that includes forwarding tables and ingress filters that permit data streams to pass from sensor system 28 to automation module 210. In one example, configuration 325 permits transmission of a first data stream from a first sensor, such as long range RADAR 40*g*, from a first sensor port, such as port 440*g* to port 412*b* of LAN switch 410*b* as an egress port to port 412*a* of LAN switch 410*a* as an ingress port, and through port 434*c* as an egress port to sub-controller 34*c* when the current driving mode is a first driving mode, such as high-speed freeway driving mode. Similarly, configuration 325 may permit transmission of a second data stream from a second sensor, such as short range RADAR sensor 40*c*, from a second sensor port, such as port 440*c*, through port 434*c*, to sub-controller 34*c* when the current driving mode is a second driving mode, such as a parking maneuver.

When the data streams are not used in the current driving mode of the vehicle, method 500 proceeds from task 515 to task 525. Control system 100 selectively inhibits data streams through the LAN switch in task 525. For example, switch configuration module 215 may load configuration 325 into LAN switches 410*a-b*. In one example, configuration 325 causes switch 410*b* to inhibit transmission of the first data stream of long range RADAR sensor 40*g* from port 440*g* to port 412*b* when the current driving mode is a second driving mode, such as a slow speed parking maneuver. Accordingly, ports 412*b*, 412*a*, and 434*c* do not carry the data stream from sensor 40*g*, and the data throughput capacity of ports 412*b*, 412*a*, and 434*c* need not be increased to accommodate the data stream in the slow speed parking maneuver. Similarly, configuration 325 may inhibit transmission of the second data stream from port 440*c* to port 434*c* when the current driving mode is the first driving mode.

Control system 100 operates the vehicle using the filtered data streams in task 530. For example, automation module 210 is in electronic communication with LAN switch 410*b*, and therefore operates vehicle 10 based on data streams that may or may not include the data stream from sensor 40*g* depending on the determination in task 515.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A system for a vehicle, the system comprising:
a plurality of sensors configured to generate a plurality of data streams;
a mode determination module configured for determining a current driving mode of the vehicle;
an local area network (LAN) switch configured for selectively transmitting and selectively inhibiting each of the plurality of data streams based on the current driving mode of the vehicle.

2. The system of claim 1, further comprising an automation module configured to operate the vehicle and in electronic communication with the LAN switch, and wherein the LAN switch is configured for selectively transmitting each of the plurality of data streams to the automation module based on the current driving mode of the vehicle.

3. The system of claim 2, wherein the plurality of sensors includes a first sensor configured to generate a first data stream of the plurality of data streams, and wherein the LAN switch is configured for permitting transmission of the first data stream to the automation module in response to an indication that the automation module uses the first data stream to operate the vehicle in the current driving mode.

4. The system of claim 3, wherein the LAN switch is configured for inhibiting transmission of the first data stream to the automation module in response to an indication that the automation module does not use the first data stream to operate the vehicle in the current driving mode.

5. The system of claim 3, wherein the plurality of sensors further includes a second sensor configured to generate a second data stream of the plurality of data streams, and wherein the LAN switch is configured for permitting transmission of the second data stream to the automation module in response to an indication that the automation module uses the second data stream to operate the vehicle in the current driving mode.

6. The system of claim 5, wherein the LAN switch further comprises:
a first sensor port coupled for electronic communication with the first sensor to receive the first data stream;
a second sensor port coupled for electronic communication with the second sensor to receive the second data stream;
an egress port coupled for electronic communication with the automation module; and
a switch configuration module configured for:
inhibiting transmission of the first data stream from the first sensor port to the egress port in response to the automation module not using the first data stream in the current driving mode;

permitting transmission of the first data stream from the first sensor port to the egress port in response to the automation module using the first data stream in the current driving mode;
inhibiting transmission of the second data stream from the second sensor port to the egress port in response to the automation module not using the second data stream in the current driving mode; and
permitting transmission of the second data stream from the second sensor port to the egress port in response to the automation module using the second data stream in the current driving mode.

7. The system of claim 6, wherein the switch configuration module is further configured for setting a static forwarding rule configuration of the LAN switch to selectively inhibit and selectively permit transmission of the plurality of data streams.

8. The system of claim 6, wherein the switch configuration module is further configured for selectively transmitting and selectively inhibiting each of the plurality of data streams further based on limiting a bandwidth transmitted through a port of the LAN switch to below 100 megabits per second.

9. A system for an autonomous vehicle, the system comprising:
a first sensor configured to generate a first data stream;
a second sensor configured to generate a second data stream;
an automation module configured for driving the autonomous vehicle in a first driving mode using the first data stream and for driving the autonomous vehicle in a second driving mode using the second data stream; and
a local area network (LAN) switch comprising:
a first sensor port coupled for electronic communication with the first sensor to receive the first data stream;
a second sensor port coupled for electronic communication with the second sensor to receive the second data stream;
an egress port coupled for electronic communication with the automation module; and
a switch configuration module configured for:
inhibiting transmission of the first data stream from the first sensor port to the egress port in response to operation of the autonomous vehicle in the second driving mode;
permitting transmission of the first data stream from the first sensor port to the egress port in response to operation of the autonomous vehicle in the first driving mode;
inhibiting transmission of the second data stream from the second sensor port to the egress port in response to operation of the autonomous vehicle in the first driving mode; and
permitting transmission of the second data stream from the second sensor port to the egress port in response to operation of the autonomous vehicle in the second driving mode.

10. The system of claim 9, wherein the switch configuration module is further configured for setting a static forwarding rule configuration of the LAN switch to selectively inhibit and selectively permit transmission of the first and second data streams.

11. The system of claim 9, wherein the switch configuration module is further configured for selectively transmitting and selectively inhibiting the first data stream further based on limiting a bandwidth transmitted through the first sensor port of the LAN switch to below 100 megabits per second.

12. A method of operating an autonomous vehicle having a first sensor, a second sensor, and a local area network (LAN) switch, the method comprising:
inhibiting transmission of a first data stream of the first sensor from a first sensor port to an egress port of the LAN switch in response to operation of the autonomous vehicle in a second driving mode;
permitting transmission of the first data stream from the first sensor port to the egress port in response to operation of the autonomous vehicle in a first driving mode;
inhibiting transmission of a second data stream of the second sensor from a second sensor port to the egress port of the LAN switch in response to operation of the autonomous vehicle in the first driving mode; and
permitting transmission of the second data stream from the second sensor port to the egress port in response to operation of the autonomous vehicle in the second driving mode.

13. The method of claim 12, wherein selectively permitting transmission includes selectively permitting transmission to an automation module configured to operate the vehicle.

14. The method of claim 13, wherein permitting transmission of the first data stream is in response to an indication that the automation module uses the first data stream to operate the vehicle in a current driving mode.

15. The method of claim 13, wherein inhibiting transmission of the first data stream is in response to an indication that the automation module does not use the first data stream to operate the vehicle in a current driving mode.

16. The method of claim 13, wherein permitting transmission of the second data stream is in response to an indication that the automation module uses the second data stream to operate the vehicle in a current driving mode.

17. The method of claim 12, further comprising inhibiting transmission of the first data stream from the first sensor port of the LAN switch to the egress port of the LAN switch in response to the vehicle not using the first data stream in a current driving mode.

18. The method of claim 17, further comprising permitting transmission of the first data stream from the first sensor port to the egress port in response to the vehicle using the first data stream in the current driving mode.

19. The method of claim 18, further comprising:
inhibiting transmission of the second data stream from the second sensor port of the LAN switch to the egress port in response to the vehicle not using the second data stream in the current driving mode; and
permitting transmission of the second data stream from the second sensor port to the egress port in response to the vehicle using the second data stream in the current driving mode.

20. The method of claim 12, wherein selectively transmitting and selectively inhibiting each of the first data stream is further based on limiting a bandwidth transmitted through the egress port of the LAN switch to below 100 megabits per second.

* * * * *